Jan. 12, 1960 R. G. OLIPHANT 2,920,707
COMBINED CULTIVATOR AND ROW THINNER
Filed Jan. 31, 1955 3 Sheets-Sheet 1

R. G. Oliphant
INVENTOR.

BY Theodore W. Miller
Attorney

Jan. 12, 1960 R. G. OLIPHANT 2,920,707
COMBINED CULTIVATOR AND ROW THINNER
Filed Jan. 31, 1955 3 Sheets-Sheet 2
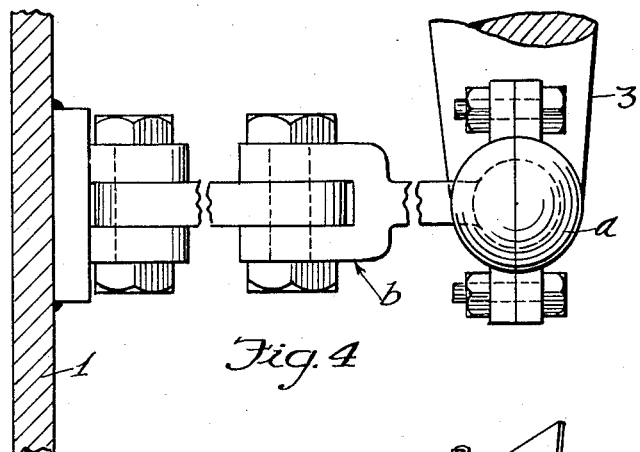
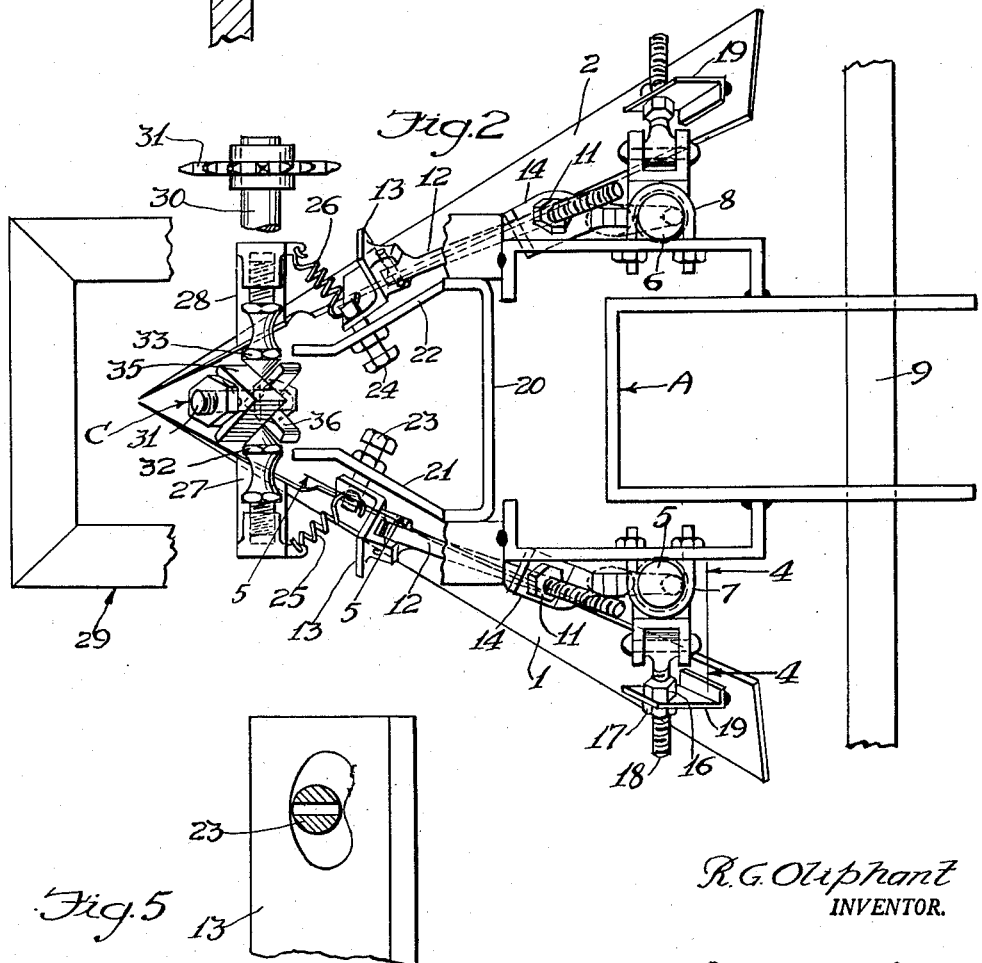
R. G. Oliphant
INVENTOR.
BY Theodore W. Miller
Attorney

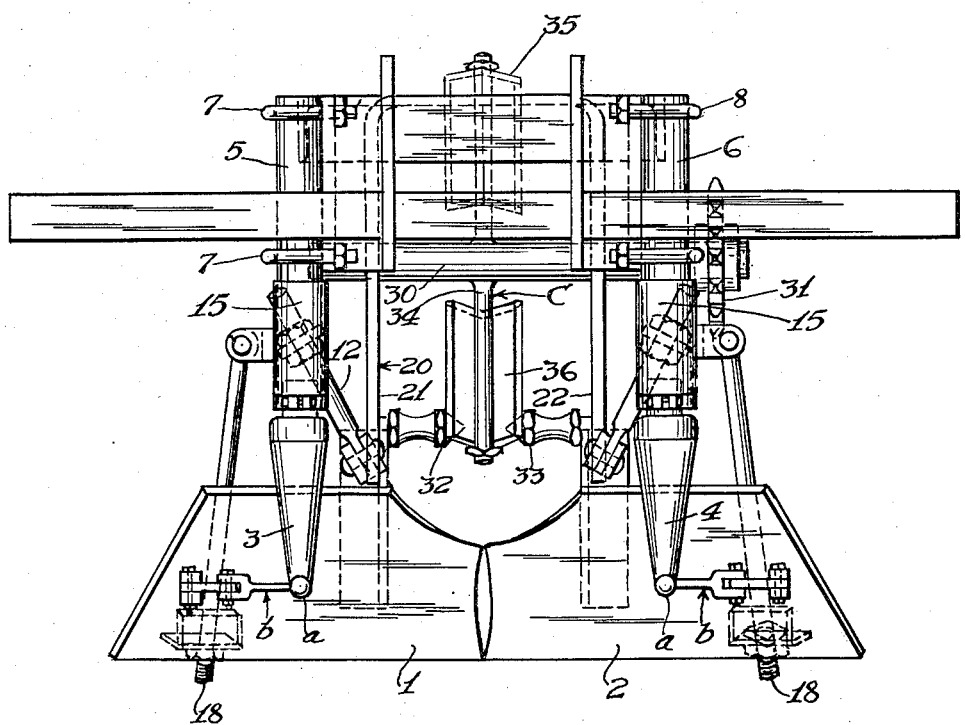

United States Patent Office 2,920,707
Patented Jan. 12, 1960

2,920,707

COMBINED CULTIVATOR AND ROW THINNER

Rufus G. Oliphant, Memphis, Tenn.

Application January 31, 1955, Serial No. 484,980

1 Claim. (Cl. 172—62)

This invention relates to a combined thinner and cultivator for rows of plants generally and cotton in particular and has for its object the provision of an apparatus of that type which is adapted to be mounted on and driven by the conventional tractor, in the form of one or more self-contained units, each unit being capable of thinning a row of plants and leaving and cultivating uniformly spaced plants in the row.

Another object is to provide an apparatus of that kind which is capable of adjustment for cut and pitch of the thinned portion of the row, which is also capable of adjustment for pitch of the hill around the spaced plants that are cultivated and which is also capable of adjustment as to the extent of distance thinned out and the spacing between the cultivated plants left in the row.

It is also an object of this invention to provide such an apparatus which is efficient and which thoroughly cleans out the rows at regular intervals and which is simple and economical of manufacture, convenient of operation and the parts of which are readily accessible for inspection, renewal or repair.

Other and further objects of this invention will become more apparent hereinafter from an examination of the specification and claim in conjunction with the accompanying drawings wherein:

Fig. 2 is a plan view of same;

Fig. 3 is a rear elevation of said unit;

Fig. 4 is an enlarged fragmentary view of the universal support for the cultivator and thinner blades taken at the line 4—4 of Fig. 2; and Fig. 5 is an enlarged fragmentary sectional view taken at the line 5—5 of Fig. 2.

Figure 1:
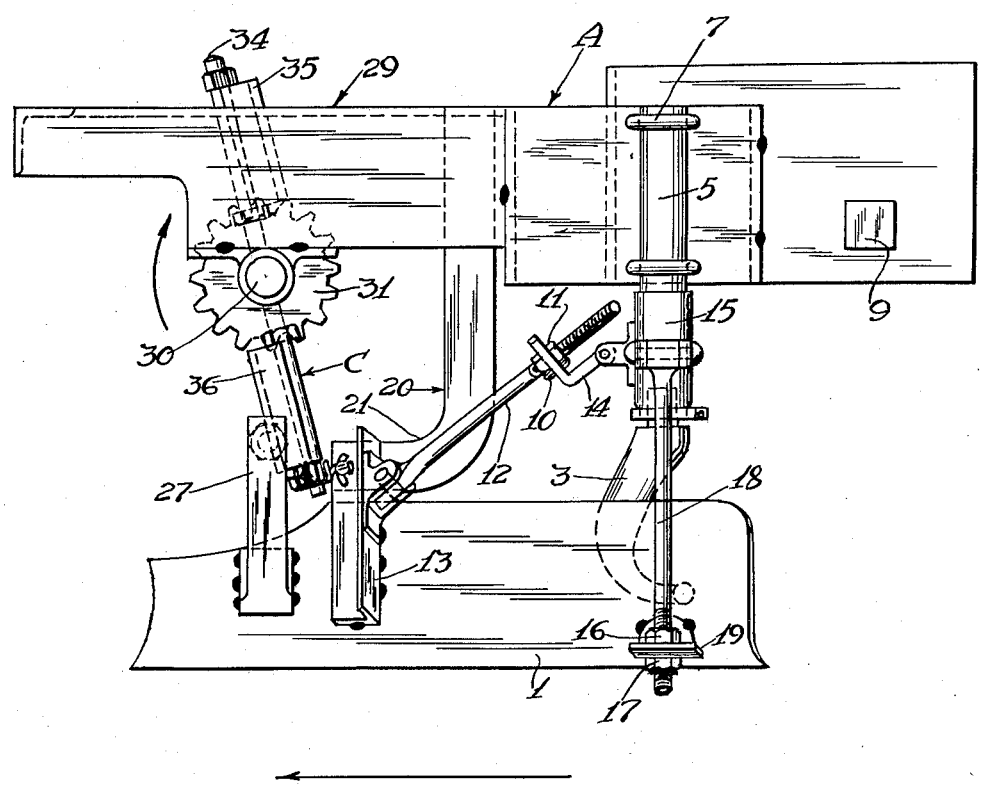
Fig. 1 is a side elevation of a combined thinner and cultivator unit embodying this invention.

Referring to the drawings more particularly, reference characters 1 and 2 represent opposite and similar cultivator and cleaning blades carried by universal supports 3 and 4 fastened to the lower ends of rods 5 and 6 respectively. These rods are bolted to the supporting framework A of the apparatus by U-bolts 7 and 8. The supports 3 and 4 are each provided, as shown in Fig. 4, with a ball and socket *a* and linkage *b* connection to the respective blade. The frame A is mounted on a mounting bar 9 which is a standard mounting bar mounted transversely at the front of all conventional tractors.

Each of the blades 1 and 2 is adjustable as to its longitudinal pitch by nuts 10 and 11 on the threaded upper end of a pivoted arm 12. The lower end of arm 12 is pivotally mounted on an angle iron section 13 welded to the outer forward face of the respective blade. The threaded upper end of the arm 12 extends through an angular bracket 14 pivotally mounted on a forked extension on a collar 15 mounted on the lower end of the rods 5 and 6.

Each of the blades 1 and 2 is adjustable as to its angularity about a longitudinal axis by nuts 16 and 17 on the threaded lower end of a pivoted arm 18. The upper end of arm 18 is pivotally mounted in a forked extension on the collar 15 and the lower end extends through an angle iron section 19 welded to the outer rear face of the respective blade.

A U-shaped stabilizer beam 20 is welded to the frame A with depending spaced arms 21 and 22 extending to a mean position adjacent the inner faces of the forward ends of the blades. Bolts 23 and 24 extend outwardly of the arms 21 and 22 and are adjustably threaded therein and provided with lock-nuts so that they may be locked in adjusted position. Their respective outer ends are apertured to receive the inner end of tension springs 25 and 26, respectively. The outer ends of springs 25 and 26 are respectively connected to the upper ends of angle iron mounting sections 27 and 28 welded to the front ends of the respective blades. Thus the springs 25 and 26 normally tend to maintain the blades in closed position.

The frame A includes a forward rectangular section 29 of conventional angle irons welded together. Two spaced bearings are welded to the undersides of the longitudinal elements of the section 29 for supporting a transverse drive shaft 30 on one end of which is a sprocket 31. The sprocket 31 is driven by a chain (not shown) from the power output shaft of the tractor.

Two adjustable cams 32 and 33 are oppositely disposed and threadedly mounted in the upper ends of mountings 27 and 28, respectively. An operating cam generally designated C is mounted on the shaft 30 intermediate the bearings on the longitudinal elements of frame section 29 and it is adapted to engage and disengage the cams 32 and 33 so as to open and close the blades twice in every revolution of the shaft. The operating cam C comprises a rod 34 extending transversely through the shaft 30, swaged at the surface of the shaft on either side to be rigidly held therein. Oppositely pointed angle iron sections 35 and 36 are mounted on the outwardly extending sections of rod 34, respectively, so that each angle iron section will simultaneously engage and disengage cams 32 and 33 twice during rotation of said shaft. Nuts are provided on the rod 34 for holding the sections 35 and 36 thereon.

The apparatus operates on the scraper principle. The tractor (not shown) may be driven to cause the apparatus to travel along a row of plants, especially cotton plants, automatically taking out the plants for a predetermined distance upon the closing of the blades. Then the scraper blades open by cam action allowing one plant to stand and then closing and removing throughout another portion of the row. This provides a two-fold advantage in that it leaves the plants spaced an equal distance apart, which is not always the case with a crosswise drag, and it enables cultivating or cleaning the rows during the thinning operation.

When operating cam C is not in contact with cams 32 and 33 the blades are in closed position traveling along the row, cleaning and thinning grass along the row. However, when cam C and cams 32 and 33 engage, the cultivator blades open to a predetermined setting allowing any plant or plants in the row to remain standing while the blades are held open by this cam action. After cam C loses contact with cams 32 and 33, the blades are returned to normal closed position by action of springs 25 and 26. The blades travel a greater distance in closed than in open position. Cams 32 and 33 may be adjusted to provide a greater or lesser amount of spacing between plants. The drive sprocket 31 may be changed to vary the spacing of the plants.

Nuts 10 and 11 may be adjusted to vary the longitudinal pitch of the blades and nuts 16 and 17 may be adjusted to vary the pitch of the hill around each plant.

Other advantages of my invention will be apparent from the foregoing description.

I am aware that many details may be varied without departing from the principles of my invention and I therefore do not wish to be limited to the details shown and described.

I claim:

An apparatus of the character described comprising a pair of scraper blades, means for pivotally supporting said blades at their respective rear edges with their forward edges in proximity and their rear edges comparatively widely spaced, said means permitting a limited amount of lateral movement of said blades at their forward edges, yieldable means normally holding the forward edges of said blades together, laterally adjustable contact members mounted on said blades, cam means engageable therewith for actuating said blades apart at their forward edges a predetermined amount, said contact members being adjustable to vary the width of opening of said blades, and means for variably adjusting the longitudinal pitch of said blades, said cam means including an elongated cam member rotatably supported so as to engage said contact members in any extremity of pitch adjustment.

References Cited in the file of this patent

UNITED STATES PATENTS

| | | |
|---|---|---|
| 216,059 | Pugh | June 3, 1879 |
| 447,749 | Cobb | Mar. 3, 1891 |
| 733,237 | Mackey | July 7, 1903 |
| 892,564 | Steele | July 7, 1908 |
| 907,864 | Norton | Dec. 29, 1908 |
| 1,319,412 | Nichols | Oct. 21, 1919 |
| 1,696,802 | Kaufman | Dec. 25, 1928 |
| 2,706,437 | Sanders | Apr. 19, 1955 |